W. H. LLEWELLYN & A. G. OLNEY.
APPARATUS FOR THE MANUFACTURE OF PLATE ICE.
APPLICATION FILED JULY 18, 1907.
974,162.
Patented Nov. 1, 1910.
2 SHEETS—SHEET 1.
FIG.1.
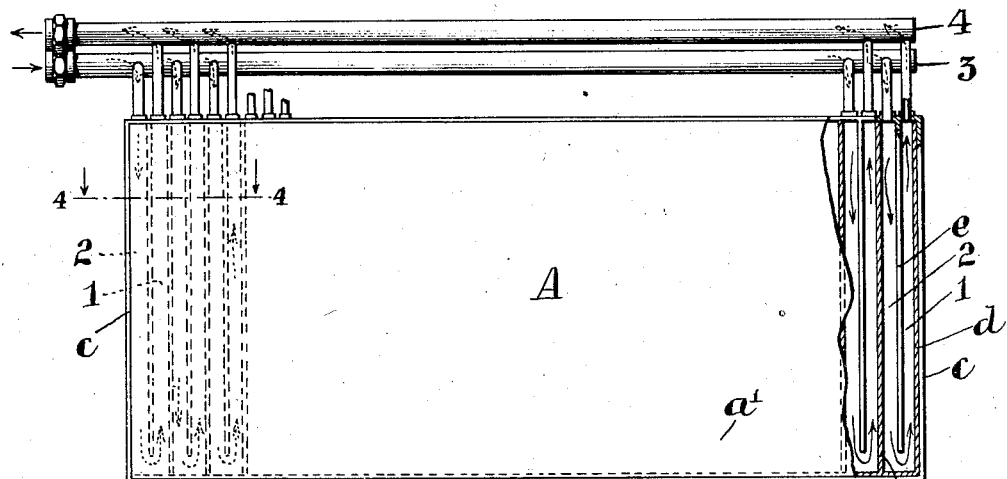
FIG.2.     FIG.3.     FIG.4.
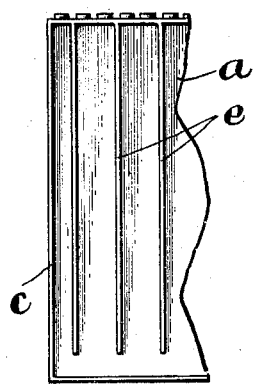 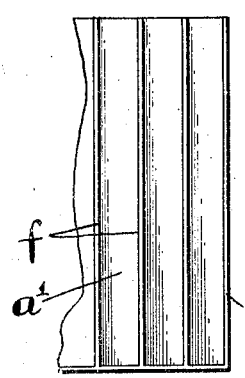 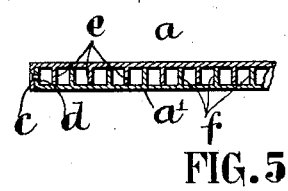
FIG.5.
FIG.6.
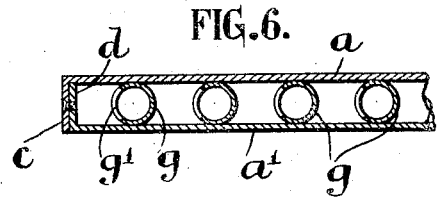
Attest:
Mitchell
L. F. Browning
Inventors:
Wm H. Llewellyn
Arthur G. Olney
by Edward C. Davidson
Atty

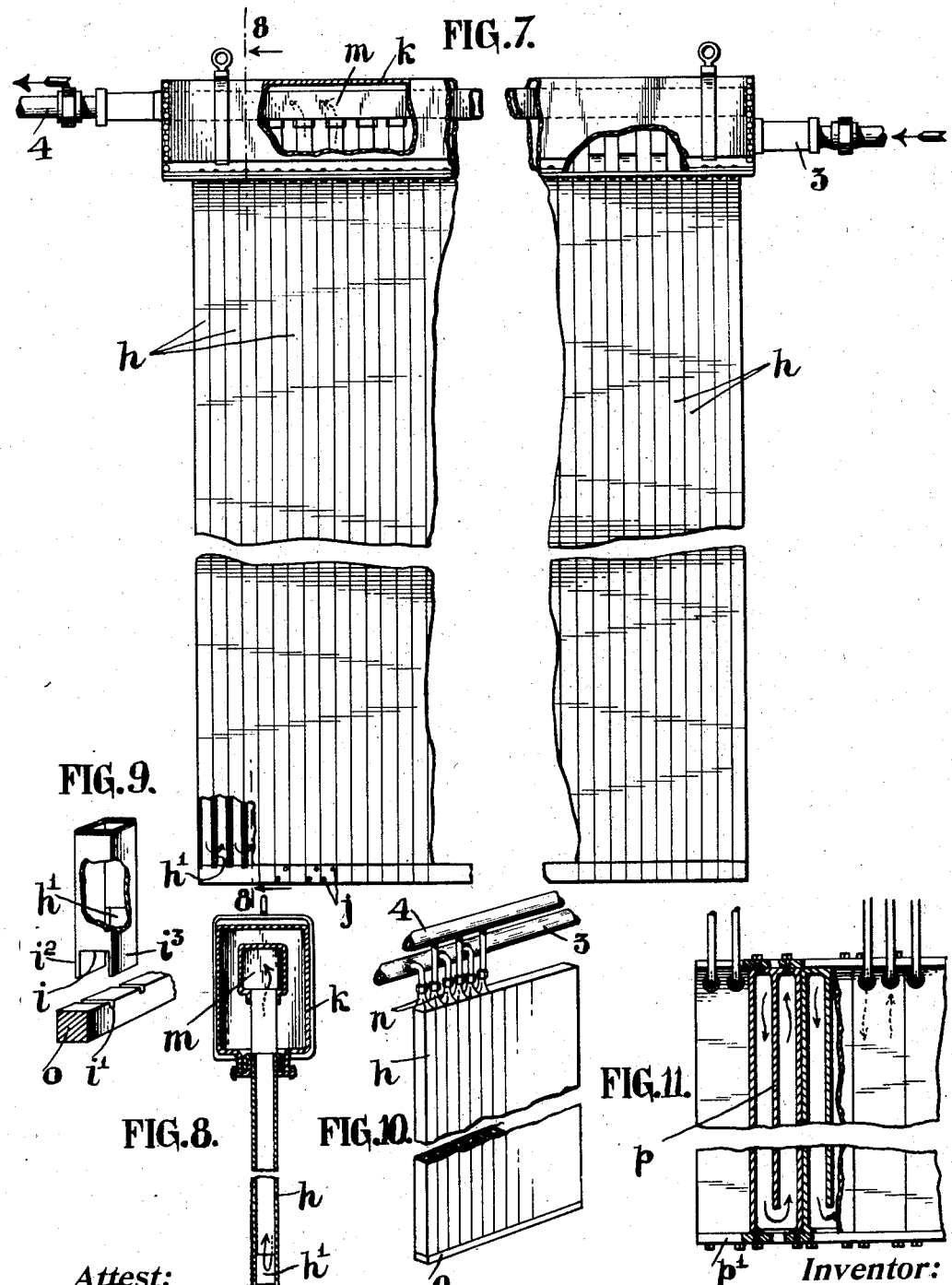

UNITED STATES PATENT OFFICE.

WILLIAM H. LLEWELLYN AND ARTHUR G. OLNEY, OF NEW YORK, N. Y.

APPARATUS FOR THE MANUFACTURE OF PLATE-ICE.

974,162.

Specification of Letters Patent. Patented Nov. 1, 1910.

Application filed July 18, 1907. Serial No. 384,317.

*To all whom it may concern:*

Be it known that we, WILLIAM H. LLEWELLYN, of the borough of Brooklyn, city and State of New York, and ARTHUR G. OLNEY, of the borough of Manhattan, city, county, and State of New York, citizens of the United States of America, have invented certain Improvements in Apparatus for the Manufacture of Plate-Ice, of which the following is a specification.

The invention comprises a novel form of freezing plate, to be so arranged that the ice cake will form around it, and having plane faces to facilitate disengagement of the ice cake therefrom.

In the accompanying drawings: Figure 1 is a side elevation partly in section showing one form of the devices. Figs. 2 and 3 are respectively detail elevations of the front and back portions of the freezing plate; and Fig. 4, a detail cross section showing the relations of the front and back portions and partitions carried thereby; Fig. 5, a partial side elevation partly broken showing a modification of the construction; and Fig. 6, an enlarged detail transverse section thereof on line 6, 6, of Fig. 5; Fig. 7, a side elevation partly broken away showing still another modification of the structure; Fig. 8, a transverse section therethrough on the line 8, 8, of Fig. 7; Fig. 9, a detail perspective view showing one of the refrigerant circulating tubes and a base piece to which they are applied; Fig. 10, a perspective view partly broken away showing a further modification; and Fig. 11, a partial side elevation partly in section showing still another modification.

In Figs. 1 to 4 inclusive the freezing plate is composed of shallow flanged telescoping front and back pieces $a$, $a'$ that fit together like the parts of a rectangular flat shallow box. The flanges $c$, $d$, of the respective parts $a$, $a'$ are of equal width so that when the two parts are placed together, the outline of a cross section thereof will be a symmetrical relatively very narrow or thin rectangular figure. On the inner face of the part $a$ are a series of rib partitions $e$ and on the part $a'$ are a series of corresponding partitions $f$ which fit between the partitions $e$ forming a series of refrigerant circulating channels or ducts rectangular in cross section. The rib partitions on one of the parts, for instance, those $e$ on the part $a$ do not extend entirely to the bottom of the plate and, therefore, when the two sections are placed together, as in Fig. 4, there will be pairs of vertical channels 1, 2 (Fig. 1) in communication at the bottom. The channels 2 may all be connected to a refrigerent supply pipe 3 and the channels 1 all connected to a refrigerant discharge pipe 4. The refrigerant fluid will therefore descend in each channel 2 and ascend in each channel 1. With such a construction the refrigerating medium is separated, throughout its entire passage through the plate, from the water to be frozen by a single wall of metal that may be relatively thin. A less advantageous arrangement although one possessing some of the advantages incident to the plate described, is shown in Figs. 5 and 6. In this case the rib partitions $e$, $f$, are replaced by pipes $g$ of diameter sufficient to fill the space between the front and back plates $a$, $a'$ and having openings $g'$ on one side near their bottoms. The refrigerating medium may enter from the supply pipe 3 descending in the pipes $g$ and rising in the channels formed by the pipes and the walls of the parts $a$, $a'$ and be discharged into the outlet pipe 4.

In Figs. 7, 8 and 9, the refrigerant circulating ducts or channels are formed by separate square pipes $h$ placed side by side and connected in pairs at the bottom by openings $h'$ in alternate pairs of contiguous walls. Each pair of pipes forms two vertical channels connected at the bottom through one of which the refrigerating medium enters and through the other of which it leaves the plate. The several square pipes so arranged side by side to form a smooth, flat or plane-faced freezing plate may be coupled at the bottom by a transversely grooved end piece. The several pipe sections are cut away at the sides and the horizontal or top edges $i$ of such notched or cut away parts fit within the transverse grooves $i'$ of the end bar, while the front and rear faces $i^2$, $i^3$ of the pipes embrace the front and rear faces of the bar. When the several pipes and end bar are so assembled, the entire assemblage of parts may be made water tight at the bottom by brazing or in other suitable ways, the parts $i^2$, $i^3$ of the pipes being preferably riveted to the end bar $i'$ as indicated at $j$ in Fig. 7. The pairs of pipes whose contiguous walls are cut away as at $h'$ to afford communication at the bottom may be brazed together at the opening to prevent leakage and then the several pairs of pipes may be assembled in a complete plate in the manner described. The alternate pipes may receive the refrigerating medium from a supply header $k$ to which their upper ends are attached as indicated in the drawings or otherwise. Within the supply header is contained the outlet header $m$ connected with the other alternate pipes.

In Fig. 10, the square pipes are formed at the top with circular nipples $n$ to which may be applied ordinary couplings to connect them alternately with the supply and discharge pipes. The bottoms of the pipes may be individually closed and the pairs brazed or otherwise made water tight at the openings $h'$. They need not be otherwise connected, but may all be secured to a bottom.

Fig. 11 shows an arrangement similar to Figs. 1 to 4 except that in this case pairs of channels down one of which and up the other of which the refrigerating medium circulates are formed in one casting $p$ and the plate is built up by the assemblage of a desired number of such castings to form a flat plane-faced plate. The castings may all be united at the bottom by a connecting bottom piece $p'$ and at the top are to be alternately connected to the supply and discharge pipes.

In all cases it is contemplated that the connections for supplying the headers (or supply and discharge pipes 3 and 4) may be disconnected so that the freezing plate with the attached ice cake may be hoisted from the freezing tank and connected for the circulation for a thawing off medium. After detachment of the ice cake the freezing plate is to be returned to the tank. A plurality of such freezing plates may be arranged in a freezing tank of suitable dimensions with the ends and bottoms of the plates out of contact with the walls of the tank and, therefore, a plurality of ice cakes may be in process of formation at the same time. The removal of one freezing plate with its attached ice cake will in no way interfere with the progress of formation of ice cakes on the other plates.

With the construction described, the ice plates may be made relatively thin and when withdrawn from the ice cake there is a very narrow cavity in the latter cake. The width of this cavity need not exceed one-half inch, and may be even smaller, and is of such small capacity that if filled with water the water will freeze during the tempering of the ice the result being a perfectly clear homogeneous solid cake of plate ice.

It is contemplated that this freezing plate may be used in the manner disclosed in the patent to Havenstrite No. 842,147, dated January 22, 1907, it being an improvement upon the plate disclosed in that patent.

The formation of a cake of ice may be expedited by employment of two plates placed sufficiently close together, and which when withdrawn from the cake will leave two cavities therein.

We claim:

1. A thin plane-faced freezing-plate for making plate ice, comprising front and rear walls and vertical partitions forming a plurality of independent pairs of connected vertical refrigerant circulating channels whose front and rear walls form parts of the front and rear surfaces of the plate.

2. A thin plane-faced freezing-plate for making plate-ice, comprising front and rear plates and intervening partitions dividing the interior space of the plate transversely into independent pairs of connected vertical refrigerant channels.

3. A thin plane-faced freezing plate for making plate-ice, comprising front and rear walls and vertical partitions forming a plurality of independent pairs of connected vertical refrigerating channels whose front and rear walls form parts of the front and rear surfaces of the plate and means for introducing a fluid refrigerant at the top of one channel of each pair and withdrawing it from the top of the other channel of each pair.

4. A freezing member comprising front and rear walls, end walls and a vertical transverse division wall forming connected refrigerant circulation channels down one and up the other of which a fluid refrigerant may be circulated.

In testimony whereof, we have hereunto subscribed our names.

WILLIAM H. LLEWELLYN.
ARTHUR G. OLNEY.

Witnesses:
GEORGE KITCHING,
HARRY SLOAN.